(12) United States Patent
Little

(10) Patent No.: US 9,400,641 B2
(45) Date of Patent: Jul. 26, 2016

(54) ADAPTABLE MIDDLEWARE LAYER

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/409,052

(22) Filed: Feb. 29, 2012

(65) Prior Publication Data
US 2013/0227547 A1 Aug. 29, 2013

(51) Int. Cl.
G06F 9/445 (2006.01)
G06F 9/44 (2006.01)

(52) U.S. Cl.
CPC ... G06F 8/60 (2013.01); G06F 8/31 (2013.01)

(58) Field of Classification Search
CPC .......................................................... G06F 8/60
USPC .......................................................... 717/177
See application file for complete search history.

(56) References Cited

U.S. PATENT DOCUMENTS

| 8,239,526 B2 * | 8/2012 | Simpson et al. ............. 709/224 |
| 8,448,170 B2 * | 5/2013 | Wipfel et al. ..................... 718/1 |
| 2005/0251527 A1 * | 11/2005 | Phillips et al. ................ 707/101 |
| 2010/0077080 A1 * | 3/2010 | Ku et al. ........................ 709/226 |
| 2011/0154379 A1 * | 6/2011 | Gamanho ...................... 719/330 |
| 2012/0066663 A1 * | 3/2012 | Adhikary et al. .............. 717/104 |
| 2012/0158980 A9 * | 6/2012 | Itoh et al. ...................... 709/230 |
| 2012/0210292 A1 * | 8/2012 | Zhang et al. ................... 717/104 |
| 2012/0324069 A1 * | 12/2012 | Nori et al. ...................... 709/222 |

OTHER PUBLICATIONS

Manuel Roman et al., "A Middleware-Based Application Framework for Active Space Applications", Department of Computer Science, University of Illinois, Champaign, IL, 22 pages.

Andrei Popovici et al., "A Proactive Middleware Platform for Mobile Computing", Department of Computer Science, Swiss Federal Institute of Technology (ETHZ), Zurich, Switzerland, 19 pages.

* cited by examiner

*Primary Examiner* — Li B Zhen
*Assistant Examiner* — Sen Chen
(74) *Attorney, Agent, or Firm* — Lowenstein Sandler LLP

(57) ABSTRACT

A middleware layer running on a computing device determines capabilities of the computing device in response to receiving a request for an application. The middleware layer identifies a service level agreement associated with the application. The middleware layer selects one or more services of the middleware layer to assign to the application based on the service level agreement and the capabilities of the computing device. The middleware layer determines whether to install the one or more services on the computing device or on a remote computing device based on the service level agreement, the capabilities of the computing device and properties of the one or more services.

16 Claims, 9 Drawing Sheets

ADAPTABLE MIDDLEWARE LAYER

TECHNICAL FIELD

Embodiments of the present invention relate to distributed systems, and more specifically to an adaptable middleware layer that facilitates development and execution of applications such as enterprise applications.

BACKGROUND

Middleware (also known as a middleware layer) is traditionally a class of computer software that provides services to software applications beyond those services available from an operating system. Commonly, a middleware layer enables communication and management of data in distributed applications.

Traditional middleware is designed to run in resource rich environments, such as on servers and personal computers. However, traditional middleware is not generally compatible with resource constrained devices such as mobile phones, personal digital assistants (PDAs), tablet computers, and so forth. Additionally, traditional middleware is not generally available in embedded systems. Accordingly, enterprise class services such as security, high performance messaging, transactions, and so on are not traditionally made available on resource constrained devices or embedded systems.

BRIEF DESCRIPTION OF THE DRAWINGS

The present invention is illustrated by way of example, and not by way of limitation, in the figures of the accompanying drawings and in which.

DETAILED DESCRIPTION

Figure 1:
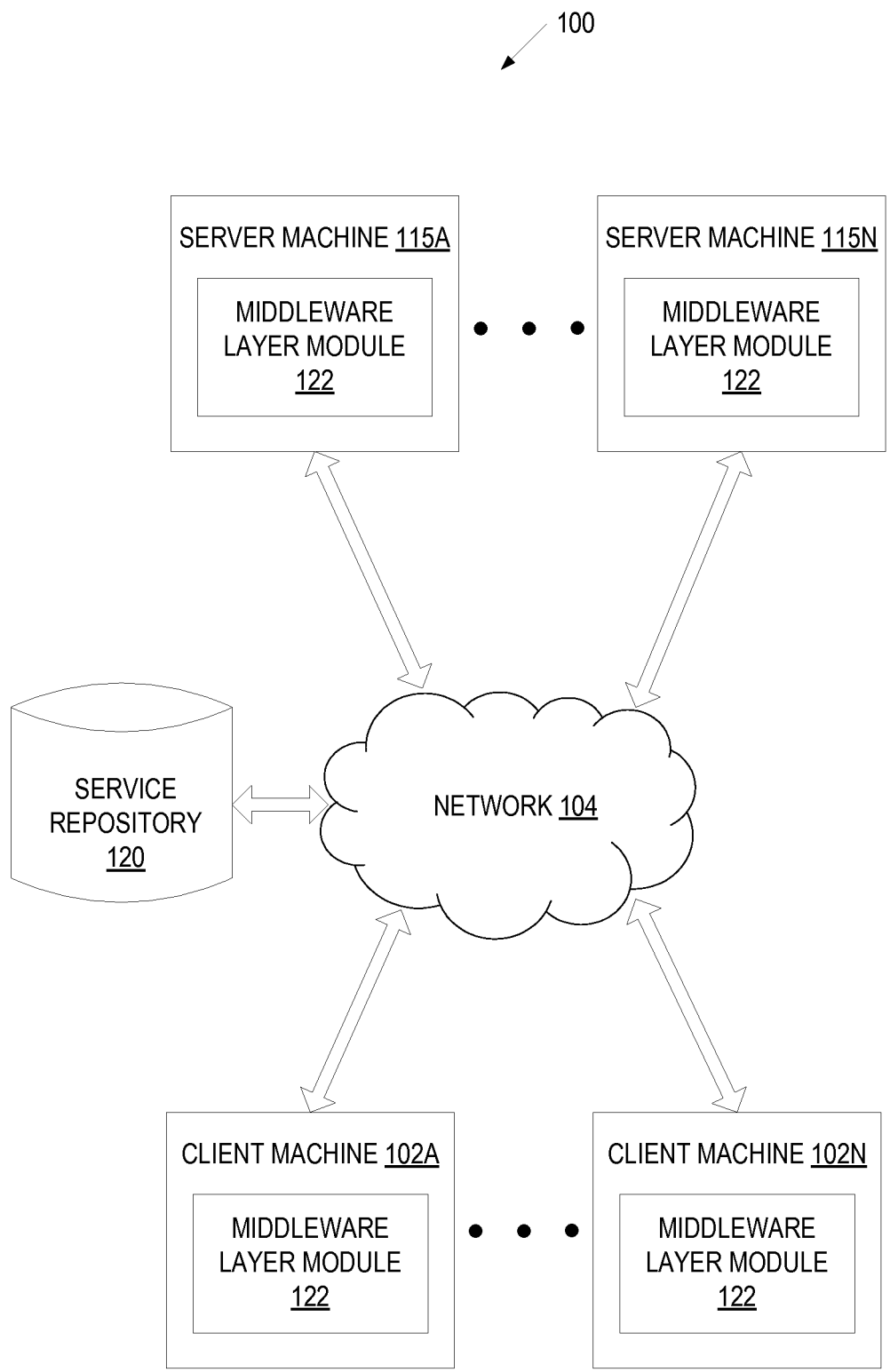
FIG. 1 illustrates an exemplary distributed computing system, in which embodiments of the present invention may operate.

Described herein is an adaptable middleware layer, and a method and apparatus for dynamically adapting a middleware layer as a computing environment changes. In one embodiment, a middleware layer running on a computing device determines capabilities of the computing device in response to receiving a request for an application. The middleware layer identifies a service level agreement associated with the application. The application may be a distributed application, such as an airline booking application, an online banking application, and so forth. The application may also be a standalone application or a component of a distributed application.

The middleware layer selects one or more services of the middleware layer to assign to the application based on the service level agreement and the capabilities of the computing device. The middleware layer then determines whether to install the one or more services on the computing device or on a remote computing device based on the service level agreement, the capabilities of the computing device and properties of the one or more services. The middleware layer may monitor the application and computing devices on which one or more provided services are running. The middleware layer may then adjust the services of the middleware layer by migrating services, selecting new services, and so forth as a computing environment changes (e.g., as a user switches from a desktop computer to a mobile phone).

Embodiments of the present invention relate to an adaptable and reconfigurable middleware layer. A middleware layer is a class of software that provides services to applications beyond those services traditionally provided by an operating system. Examples of middleware layers include remote procedure calls (RPC), message oriented middleware (MOM), object request brokers (ORB), enterprise service buses (ESBs), etc. A remote procedure call (RPC) enables an application (e.g., a client) to cause a subroutine or procedure to execute in an address space that is different from an address space in which the application is running. For example, a remote procedure call could permit system manager to cause a service to execute a procedure (e.g., to perform one or more operations). Message oriented middleware (MOM) is a client/server infrastructure that allows an application to be distributed over multiple machines, each of which may be running the same or different operating systems. Object request brokers (ORB) enable applications to make program calls between machines over a network. The most common implementation of an ORB is the common object request brokerage architecture (CORBA). Enterprise service buses (ESB) are described below.

The middleware layer described in embodiments of the present invention is flexible and adaptable, and can operate on multiple different types of computing devices, such as mobile phones, tablet computers, digital cameras, game consoles, and so on. The middleware layer may also run on an embedded system. An embedded system is a computer system designed for specific control functions within a device. Embedded systems typically include microcontrollers and/or digital signal processors (DSPs) that are dedicated to handle a particular task or tasks. Examples of embedded systems include computing devices that control digital watches, traffic lights, home automation systems, refrigerators, televisions, coffee makers, garage door openers, and so forth. Applications running on top of the middleware layer may not have any indication as to where the applications are running and/or where underlying services utilized by the application are running. This enables programmers to develop applications that can be used across many types of computing devices, and that can migrate between diverse computing devices without interruption. Additionally, the adaptable middleware may bring enterprise class middleware services such as reliable messaging, security and transactions to resource constrained devices and/or embedded systems.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "determining", "selecting", "migrating", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

FIG. 1 illustrates an exemplary distributed computing system 100, in which embodiments of the present invention may operate. The distributed computing system 100 includes a middleware layer that is implemented by a collection of middleware layer modules 122. In one embodiment, the middleware layer is a service oriented architecture (SOA) middleware layer. A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

In one embodiment, the middleware layer includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

The distributed computing system 100 may include client machines 102A-102N and server machines 115A-115N, connected via a network 104. The network 104 may be a public network (e.g., Internet), a private network (e.g., a local area Network (LAN) or wide area network (WAN)), or a combination thereof. The network 104 may additionally include a wireless network such as provided by a wireless carrier.

Client machines 102A-102N may be, for example, personal computers (PC), palm-sized computing devices, personal digital assistants (PDA), mobile phones, tablet computers, game consoles, desktop computers, servers, databases, or other computing devices. Client machines 102A-102N may also be electronic devices with embedded systems, such as routers, televisions, refrigerators, coffee makers, home security systems, kitchen appliances, consumer electronics, and so forth.

Server machines 115A-115N may be, for example, personal computers (PC), palm-sized computing devices, personal digital assistants (PDA), mobile phones, tablet computers, game consoles, desktop computers, servers (e.g., rackmount servers), databases, or other computing devices. Typically, a server machine 115A-115N will have more available resources than a client machine 102A-102N. However, some server machines 115A-115N may be resource constrained, and/or some client machines 102A-102N may have an abundance of resources. Also, traditionally server machines will provide application level services such as business logic that runs in application servers. Client machines typically run applications that consume data provided by application level services and/or that interact with application level services. However, client machines may also run application level services, and server machines may also include client applications.

Server machines 115A-115N and client machines 102A-102N may run middleware layer modules 122. The middleware layer modules 122 may communicate with one another to establish a middleware layer. Alternatively, a middleware layer module 122 may create a standalone middleware layer on a host machine (e.g., on a client machine or server machine). Middleware layer modules 122 may run middleware services, which may provide functionality to applications and services running on server machines 115A-115N and/or client machines 102A-102N.

A client machine 102A-102N may run an application that uses the middleware layer. The application may be a distributed application, may be a standalone application, or may be a component of a distributed application. When the application loads on a client machine 120A-102N, the middleware layer modules 122 may determine middleware services and/or other services that will be used to support the application, and may determine whether to execute those middleware services and/or other services on the client machine 102A-102N or a remote machine (e.g., another client machine 102A-102N and/or a server machine 115A-115N). The middleware layer modules 122 may then load the middleware services and/or other services on the determined machines. The middleware modules 122 may additionally migrate, uninstall, install and/or update middleware services as the distributed computing system 100 changes. For example, if an application originally running on a personal computer (PC) client machine is migrated to a mobile phone client machine, the services may be updated, replaced and/or migrated.

In one embodiment, the middleware layer modules 122 have access to a service repository 120. The service repository 120 may include multiple different middleware services. For each middleware service, the service repository 120 may store a service name, a unique service identification, configuration data, code for the service (e.g., a compressed package containing the code), an SLA of the service, and so on. The service repository 120 may additionally include multiple different configurations for some or all of the services. In one embodiment, each configuration of a middleware service is treated as a completely separate service, with its own SLA, unique identifier, and so forth.

Services may be discretely defined sets of contiguous and autonomous functionality (e.g., business functionality, technical functionality, etc.). Services may be resident on personal computers (PC), servers, routers, etc. Each service may represent a process, activity or other resource that can be accessed and used by other services or applications on network 104. Each service may be independent of other services, and may be accessed without knowledge of its underlying platform implementation.

Services may be roughly divided into middleware services (e.g., those services that provide infrastructure enabling application level services and client applications to form a distributed application) and application level services (e.g., those services that provide business logic and run on tip of the middleware layer). Middleware services may include a transaction service, a security service and a reliable messaging service. Other examples of middleware services include a rules engine (e.g., Drools), jBoss business process management (JBPM), Java Contexts and Dependency Injection for the Java EE platform (CDI), and so forth. Examples of application level services include services to perform business logic such as online banking, airline booking, creating orders, shipping orders, generating invoices, and so forth. Each service may be autonomous from the other services, and may be remote from one another and have different platform implementations. However, the services may be combined and used by one or more applications or other services.

Figure 2:
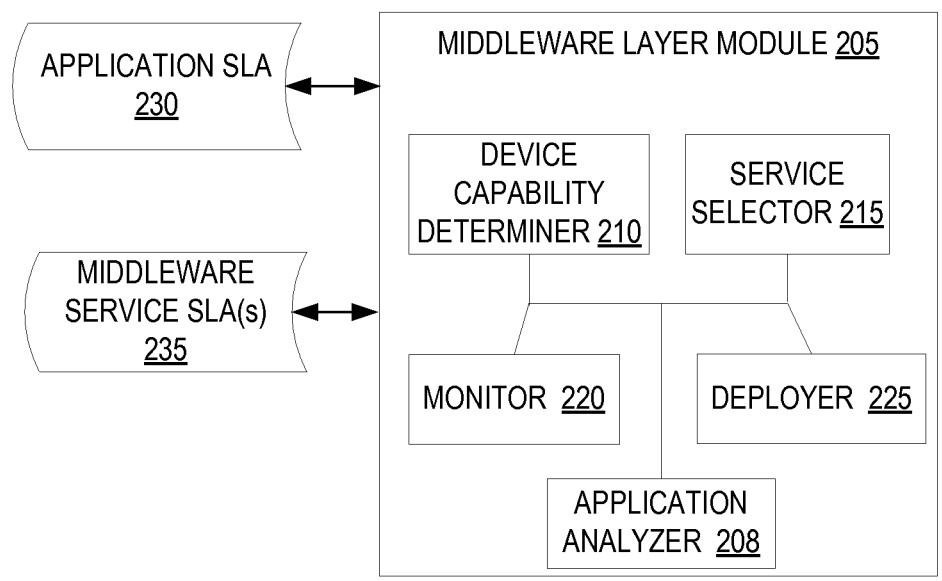
FIG. 2 illustrates a block diagram of one embodiment of a middleware layer module.

FIG. 2 illustrates a block diagram of one embodiment of a middleware layer module 205. In one embodiment, middleware layer module 205 corresponds to a middleware layer module 122 of FIG. 1. The middleware layer module 205 may include an application analyzer 208, a device capability determiner 210, a service selector 215, a monitor 220 and a deployer 225. Note that the functionality of the application analyzer 208, device capability determiner 210, service selector 215, monitor 220 and/or deployer 225 may be combined into a single component or may be split into additional components.

Middleware module 205 may be invoked prior to, or in response to, an application being loaded. The application may be a standalone application, a distributed application or a component of a distributed application, and may be loaded on a same machine on which the middleware module 205 is invoked or on a different machine.

Application analyzer 208 analyzes the loaded application to determine an initial set of middleware services. In one embodiment, application analyzer 208 analyzes a service level agreement associated with the application to determine the initial set of middleware services. The initial set of middleware services may include middleware services that perform some functionality that may be relied upon by the application. For example, if the application will use transactions, then the set of middleware services may include multiple different transactions services.

Distributed applications, standalone applications, services, and so on may each include service level agreements (SLAs). A service level agreement (SLA) is an agreement between a provider of a service and clients of the service that defines quality of service (QoS) guarantees and obligations of both the clients and of the service. QoS guarantees include measurable properties relating to non-functional aspects of the service, such as availability, performance and reliability. Examples of QoS guarantees include guaranteed up time (e.g., guaranteed percentage of time available vs. time unavailable), guaranteed response time (e.g., guarantee that messages will be responded to within 5 ms 95% of the time), guaranteed number of messages per hour, and so on. Examples of service obligations include security obligations, transactional obligations, reporting obligations, logging obligations, etc. Likewise, client obligations may include, for example, security obligations and transactional obligations. An SLA may also include a validity period, a list of clients to which it applies, a scope of the services to be provided (e.g., service operations covered in the SLA), penalties to apply if the QoS guarantees and/or obligations are not satisfied, and/or other parameters.

In one embodiment, the application includes an application SLA 230, and each service includes a middleware service SLA 235. Additionally, a service may include multiple different SLAs, each being associated with a different client (e.g., application) or collection of clients. A service may also include multiple SLAs that are associated with the same client or set of clients, but that apply to different service operations. For example, if a client attempts to perform a first service operation, a first SLA may apply, and if the same client attempts to perform a second service operation, a second SLA may apply. Alternatively, a service may include only one SLA that applies to all clients and to all service operations. A service may also include different SLAs for different configurations.

SLAs may explicitly or implicitly specify middleware services that the application (or other software module) associated with that SLA may rely upon. Application analyzer 208 may scan the SLA to identify explicit definitions. For implicitly defined services, application analyzer 208 may determine the QoS obligations and/or guarantees of the application, and may then determine services that will ensure that such QoS obligations and/or guarantees are met. In one embodiment, application analyzer 208 has a rules engine that compares contents of SLAs to a set of rules to determine which middleware services to include in the initial set of middleware services.

There may be multiple middleware services that can satisfy QoS guarantees and obligations specified in the application's SLA 230. For example, if the application SLA 230 specifies reliable messaging, then multiple different reliable messaging services may be identified. Each of the reliable messaging services may be associated with its own SLA 235, may have different resource requirements, may have different configuration parameters, and so forth. Middleware service SLAs 235, resource specifications, configuration parameters and so on are referred to herein generally as properties of a middleware service.

Device capability determiner 210 identifies capabilities of an underlying host on which middleware layer module 205 is running. For example, device capability determiner 210 may determine a total amount of memory and a currently available amount of memory on the host, network bandwidth for the host, latency for the host, processing power of the host, and so on. Device capability determiner 210 may compare the determined device capabilities to SLAs 235 and/or other middleware service properties associated with the initial set of middleware services. Device capability determiner 210 may then generate an updated set of middleware services by removing from the initial set of middleware services those middleware services that specify capabilities beyond capabilities available on the host machine.

The updated set of middleware services may include multiple different types of middleware services. For example, if the application's SLA 230 specifies reliable messaging and transactions, then the updated set of middleware services may include at least one reliable messaging service and at least one transactions service. The updated set of middleware services may include only a single middleware service of a particular service type, or may include multiple middleware services of that service type.

Service selector 215 selects a middleware service of each middleware service type to be used by the application. For example, if the application's SLA 230 specifies reliable messaging and transactions, service selector 215 selects one reliable messaging service and one transactions service. If there is only a single service of a particular service type in the updated set of middleware services, then service selector 215 selects that single service. If there are multiple available services of a particular service type, the service selector 215 may select an optimal service from the available services.

Service selector 215 may apply one or more service selection rules or heuristics to select a service. The service selection rules may take as input the capabilities of the host machine, QoS guarantees and obligations of the application and/or the middleware services (e.g., based on the application's SLA 230 and the service's SLAs 235), and/or other properties of the middleware services (e.g., such as resource requirements). The service selection rules may then select a middleware service based on the input information. For example, service selector 215 may select a middleware service that uses a fewest amount of resources (e.g., if the middleware layer module 205 runs on a resource constrained device). Service selector 215 may also select a middleware service that provides a best performance (e.g., if the middleware module 205 runs on a server machine). In one embodiment, service selector 215 selects a middleware service whose performance most closely matches specifications of the application's SLA 230. Other service selection rules may also be used to select middleware services.

Deployer 225 installs the selected middleware services on the host machine and/or on a remote machine. Some middleware services may specify that a middleware service is to be installed on a remote machine, and that a service proxy to that middleware service is to be installed on the host machine. The application may invoke and communicate with the service proxy, and the service proxy may then communicate with the middleware service. Therefore, the middleware service may be presented to the application as though the middleware service were collocated with the application on the host machine. Other middleware service configurations may specify that a middleware service is to be installed on the host machine, or entirely on a remote machine (without any proxy being installed on the host machine). Still other middleware service configurations may specify that a first portion of the middleware service is to be installed on the host machine, and that a second portion is to be installed on a remote machine (e.g., that has greater resources).

The service proxy may receive messages from the application (or other services), and may forward those messages to an associated middleware service running on a remote machine. The service proxy may be a simple forwarder that is configured to forward all received messages to the associated middleware service. For example, the service proxy may forward messages to the middleware service regardless of message context, message header, or other message content. Moreover, the service proxy may forward messages to middleware service without examining the messages. Alternatively, the service proxy may perform other operations on received messages. For example, the service proxy may scan a header and/or message body of a received message, and may take one or more actions based on the scan.

In one embodiment, the middleware service is a reliable messaging service, and the service proxy includes a message queue. The service proxy may store any received messages in the message queue, and may remove messages from the message queue after confirming that those messages have been successfully received by the middleware service. This may ensure that no messages are lost in the event that the client machine on which the service proxy runs crashes, in the event of a network failure or network partition, or in the event that the service proxy crashes, and so forth.

In one embodiment, a single service proxy acts as a service proxy for multiple different middleware services. In such an embodiment, the service proxy may monitor multiple different service addresses associated with different middleware services for received messages. The service proxy may examine headers of received messages to determine which middleware services those messages should be forwarded to, and may forward received messages to appropriate middleware services (e.g., to IP addresses and ports associated with particular middleware services).

In one embodiment, middleware layer module 205 includes a monitor 220 that monitors a distributed environment in which the middleware layer runs. The distributed environment may include hardware resources and/or software resources of each machine that hosts a middleware layer module 205. As the distributed environment changes, the application and/or one or more middleware services (or other services) may no longer meet QoS obligations or guarantees of the application's SLA 230 or the services' SLAs 235. When this occurs, service selector 215 may select a new middleware service or services to replace a currently deployed service or services. Deployer 225 may then replace the deployed services with the newly selected services. Alternatively, or in addition, deployer 225 may migrate deployed middleware services to different hosts.

Deployer 225 may also migrate software components such as applications and services even if no SLAs are violated. In one embodiment, service selector 215 determines an optimal selection of middlware services, and deployer 225 determines an optimal placement of those middleware services. Such determinations may be made, for example, using a neural network, a Bayesian network, or other learning algorithms that can develop heuristics to determine on optimal configuration of the distributed application. To illustrate, an example heuristic may assign hardware components having high bandwidth, high idle time and high available memory to services for which timing is important (as identified in QoS guarantees in an SLA).

As the monitor 220 gathers data, service selector 215 and/or deployer 225 can identify relationships between different performance characteristics, and between additional variables and performance characteristics. The deployer 225 can then reorganize the deployment of middleware services (e.g., migrate software components) to improve performance characteristics. For example, the service selector 215 and/or deployer 225 may determine that a high processor speed and memory capacity are associated with faster response times. The service selector 215 and/or deployer 225 may then determine that services having SLAs that require fast response times should be located on machines having a high processor speed and memory capacity. As the service selector 215 and/or deployer 225 gains new information, it becomes increasingly effective at determining how software components should be placed on the hardware components for optimal configuration.

In one example, a user may start running an application on a PC, and both a transactions service and a reliable messaging service may be deployed on the PC. The user may then stop using the PC, and may begin using a mobile phone with the same application. The mobile phone may have fewer resources than the PC, and may not be able to run the transactions service and the messaging service. Therefore, the service selector 215 may select a different reliable messaging service and a different transactions service, and deployer 225 may install both of these services on a remote machine. Deployer 225 may additionally install a proxy for these services on the mobile phone. Accordingly, the same application that was used on the PC may be used on the mobile phone, with the same underlying middleware layer. However, the actual configuration of the middleware layer may be modified to suit the updated distributed computing environment.

In addition to gathering performance characteristics of hardware components and software components, monitor 220 may also gather information on additional variables that can affect performance characteristics. One such variable is service dependency. It can be beneficial to track dependencies between services to gain an understanding of the needs of individual clients and services within the distributed computing system. Known dependencies may be used, for example, to intelligently migrate services between locations within the distributed computing system, or to track most likely points of failure within the distributed computing system.

In one embodiment, each of the services includes and/or is associated with (e.g., collocated with) a dependency reporter (not shown). The dependency reporter tracks when the service is called by, or makes calls to, other services. When the dependency reporter detects that a service calls (invokes) another service, or is called by another service, it logs the identities of the service being called and the service making the call. The identity of a service may include, for example, a process identifier (e.g., a unique Java virtual machine (JVM) in Java, or a unique Unix process in C++ on Unix) of the service or of a process on which the service is running. The identity may also include an identification of an object, procedure, function, etc. running within a process.

Each invocation/call detected by a dependency reporter represents a dependency, in which the service making the call is dependent upon the service being called. These dependencies can be tracked by monitor 220 by keeping an up-to-date status of service dependencies. In one embodiment, the dependency reporter transmits detected invocations to the monitor 220. Alternatively, the dependency reporter may maintain the detected invocations in a dependency log (not shown) or dependency database (not shown). Monitor 220 may determine dependencies from the dependency logs and/or a dependency database to identify service dependencies.

When deployer 225 determines that a middleware service is to be migrated, it may check whether that middleware service depends on any other middleware services or is depended upon by any other middleware services. If dependencies between the determined middleware service and other middleware services are identified, deployer 225 may also migrate those other middleware services.

Figure 3A:
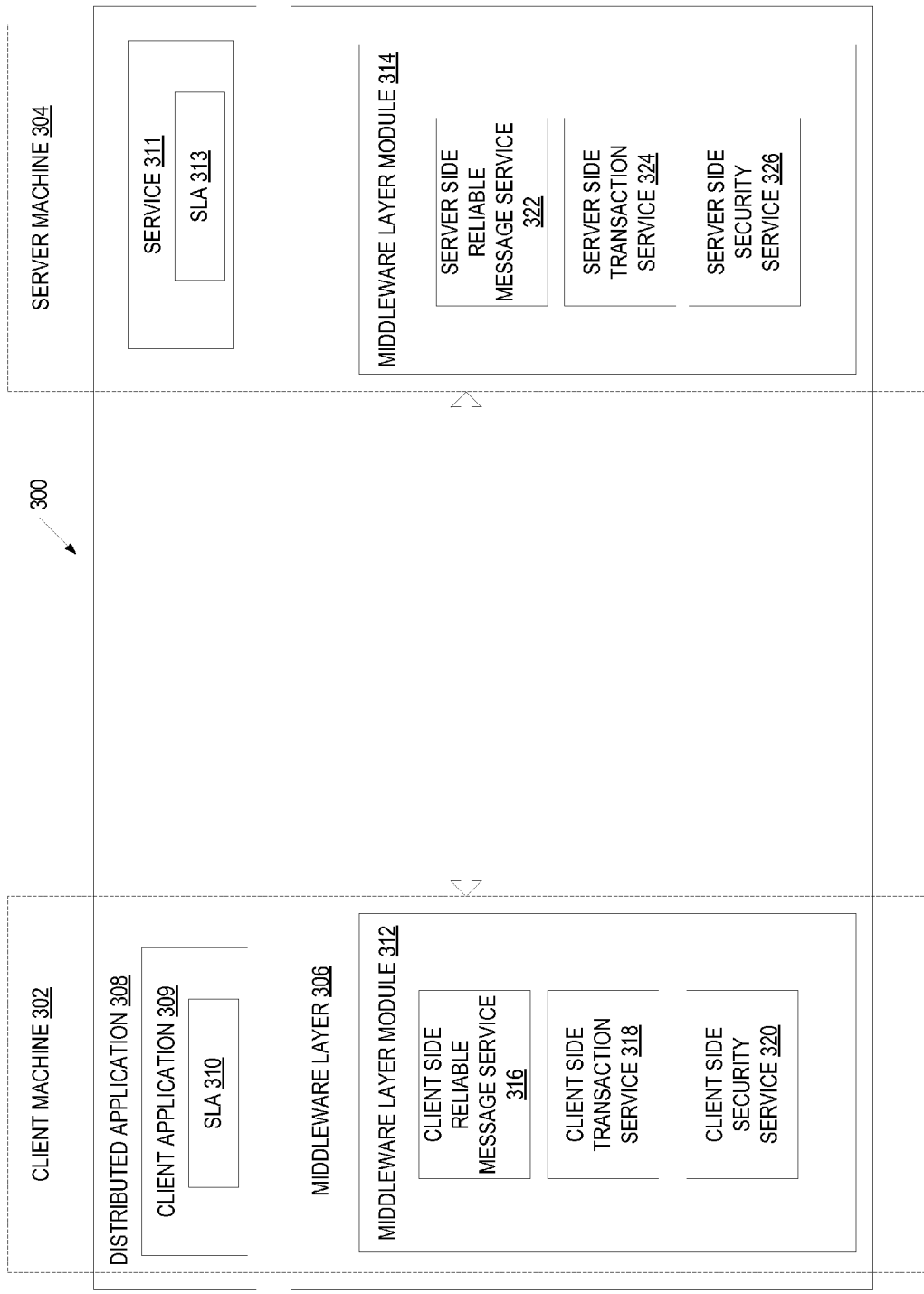
FIG. 3A illustrates a logical architecture of an application deployment of a distributed application and an underlying middleware layer, in accordance with one embodiment of the present invention.

FIG. 3A illustrates a logical architecture 300 of an application deployment for a distributed application 308 and an underlying middleware layer 306, in accordance with one embodiment of the present invention. The distributed application 308 includes a client application 309 (e.g., a web browser or other application) and a service 311 (e.g., an airline booking service).

Notably, the client application 309 runs on a client machine 302 and service 311 runs on a server machine 304. Client machine 302 and/or server machine 304 may be hardware machines or virtual machines. Client machine 302 and server machine 304 may run a general purpose operating system, an embedded system, or a combination thereof.

The distributed application 308 runs on top of a middleware layer 306 that may span the different host machines 302, 304. The middleware layer 306 includes middleware layer modules 312 and 314, which together to form the middleware layer 306. The client application 309 may include an SLA 310, and service 311 may include another SLA 313. These SLAs 310, 313 may specify QoS guarantees and/or obligations that may be satisfied by middleware layer services. For example, the SLAs 310, 313 may indicate that reliable messaging is to be used, that transactions are to be used, that logging should be performed, and so on.

Middleware layer modules 312, 314 may determine middleware layer services that will provide capabilities that will satisfy the QoS guarantees and/or obligations specified in SLAs 310, 313. For middleware services that use both a client side component and a server side component, middleware layer module 312 may install the client side components, and middleware layer module 314 may install the server side components. For example, middleware layer module 312 may install a client side reliable message service 316, a client side transaction service 318 and a client side security service 320. Similarly, middleware layer module 314 may install a server side reliable message service 322, a server side transaction service 324 and a server side security service 326. Some services will only have a server side component or a client side component. For such services, the appropriate middleware layer module will install the services.

Figure 3B:
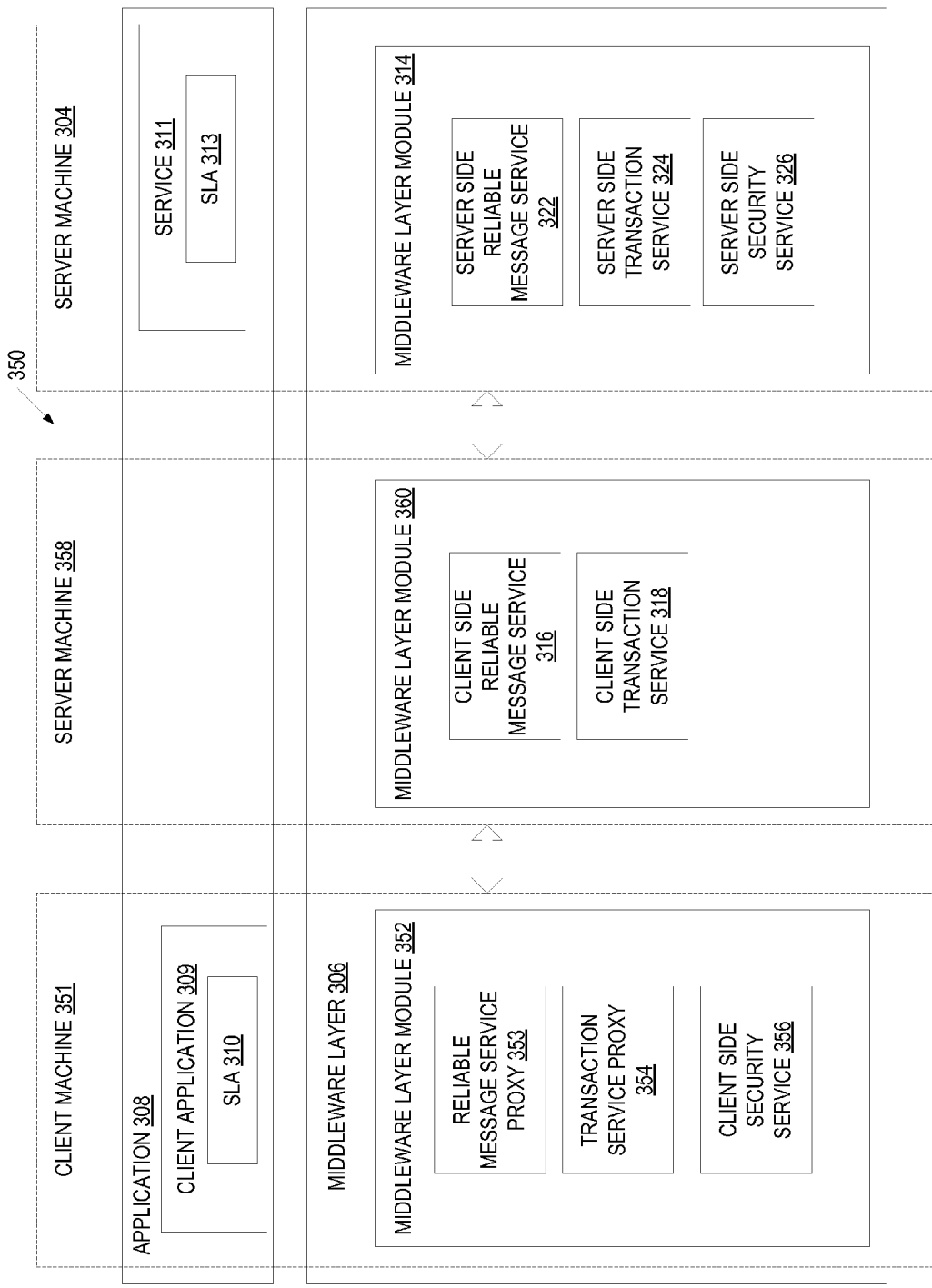
FIG. 3B illustrates another logical architecture of an application deployment of a distributed application and an underlying middleware layer, in accordance with one embodiment of the present invention.

FIG. 3B illustrates a logical architecture 350 of an application deployment for a distributed application 308 and an underlying middleware layer 306, in accordance with another embodiment of the present invention. The distributed application 308 may be a same distributed application 308 as shown in FIG. 3A, but may have a different underlying configuration for the middleware layer 306, and may run on different machines than those shown in FIG. 3A.

Notably, client application 309 has moved to a new client machine 351 that has reduced resources as compared to client machine 302. Client machine 351 may be a hardware machine or a virtual machine. Client machine 351 may run a general purpose operating system, an embedded system, or a combination thereof.

The distributed application 308 runs on top of the same middleware layer 306 described in FIG. 3A. However, the middleware layer 306 now includes a new middleware layer module 352 running on the new client machine 351 and an additional middleware layer module 360 running on an additional server machine 358. Middleware layer modules 312, 314, 360 may determine middleware layer services that will provide capabilities that will satisfy the QoS guarantees and/or obligations specified in SLAs 310, 313.

Due to the reduced resources of client machine 351, client side reliable message service 316, client side transaction service 318 and/or client side security service 320 may be incapable of running on client machine 351. Alternatively, one or more of the middleware services may not satisfy QoS obligations or guarantees of SLA 310, SLA 313, or SLAs of the middleware services. Accordingly, as shown in FIG. 3B, client side message service 316 and client side transaction service 318 have been migrated to server machine 358. Additionally, a reliable message service proxy 353 and a transaction service proxy 354 have been installed on client machine 351.

The reliable message service proxy 353 interfaces with client application 309, and forwards messages between the client application 309 and client side reliable message service 316. The client side transaction service proxy 354 may interface with client application 309, and may forward messages between the client application 309 and client side transaction service 318. Reliable message service proxy 353 may additionally include a message queue, which may be persistent (e.g., may be retained even under power loss). Messages may be stored in the message queue until it is verified that the messages will no longer be used (e.g., until confirmation of receipt of the messages by reliable message service 316 is received). This may ensure that messages are not lost as a result of network problems or failures of any machines or software in the distributed computing system.

In addition to client side reliable message service 316 and client side transaction service 318 being migrated to server machine 358, a new client side security service 356 has been installed on client machine 351. The new security service 356 may satisfy SLAs 310 and 313, but may have lower resource utilization than client side security service 320. Accordingly, FIGS. 3A-3B show how the middleware layer may automatically adapt as the computing environment that hosts the middleware layer changes.

FIGS. 4-7 are flow diagrams of various embodiments of methods for deploying a middleware layer and for updating middleware deployments. The methods are performed by processing logic that may comprise hardware (circuitry, dedicated logic, etc.), software (such as is run on a general purpose computer system or a dedicated machine), or a combination of both. In one embodiment, the methods are performed by middleware modules 122 running on client machines 102A-102N and/or server machines 115A-115N, as shown in FIG. 1.

Figure 4:
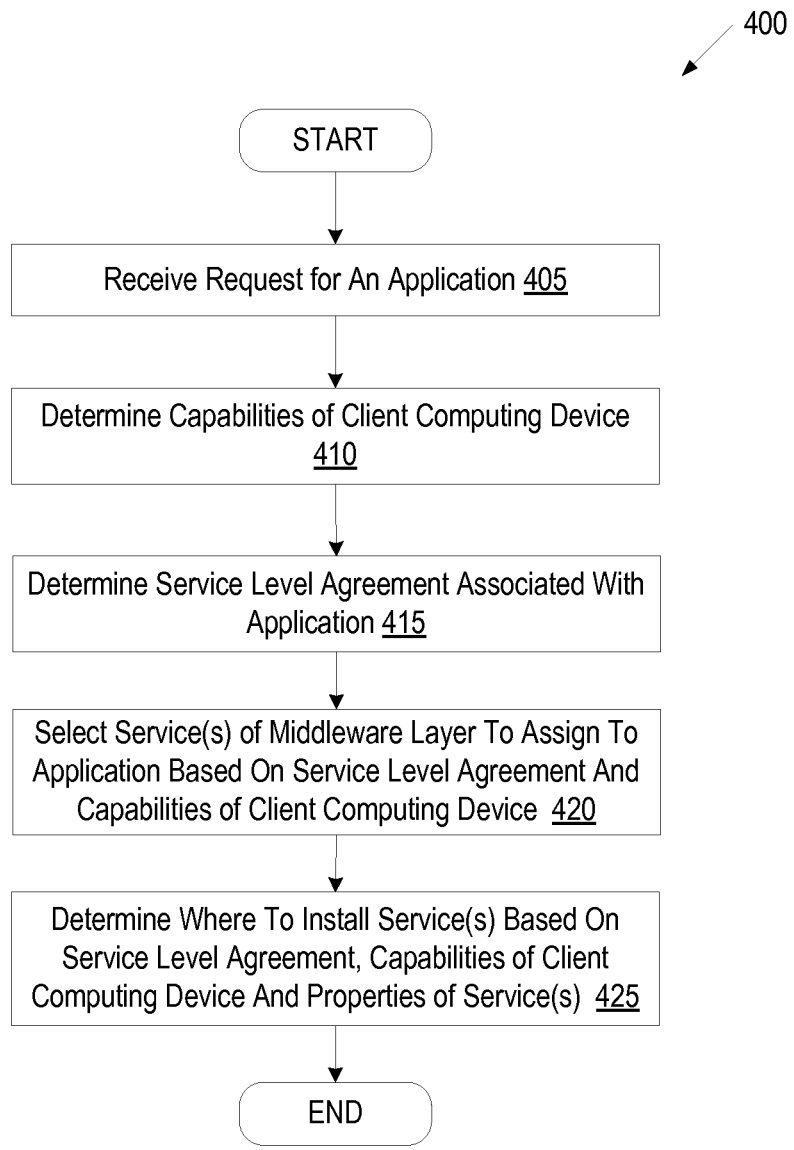
FIG. 4 illustrates a flow diagram of one embodiment for a method of deploying a middleware layer.

FIG. 4 illustrates a flow diagram of one embodiment for a method 400 of deploying a middleware layer. At block 405 of method 400, processing logic receives a request for an application. The request may be a request to run the application on a client machine. Alternatively, the request may be a request to run the application on a server machine.

At block 410, processing logic determines capabilities of the client machine (or server machine). At block 415, processing logic identifies a service level agreement associated with the application. At block 420, processing logic selects a middleware service or services of a middleware layer to assign to the application based on the SLA and the capabilities of the client machine. The service or services may additionally be selected based on SLAs of one or more application level services that will be used by the application as well as SLAs associated with the middleware services.

At block 425, processing logic determines where to install the middleware service (or services) based on the SLA, capabilities of the client machine and properties of the middleware service. The properties of the middleware service may include resource specifications of the middleware service, an SLA of the middleware service, and so on. For example, if the application will run on a resource constrained device such as a mobile phone or embedded system, the resource constrained device may not have sufficient resources to satisfy QoS obligations and/or guarantees specified in the application's SLA, an application level service's SLA or a middleware service's SLA. However, a middleware service may be installed on a remote machine, and a proxy to that middleware service may be installed on the resource constrained machine. Such a deployment may satisfy the various SLAs. In another example, a first middleware service may use 1 Megabyte of memory, and a second middleware service that performs the same functionality may use 256 kilobytes of memory. If a client machine includes 512 kilobytes of memory, then processing logic may select the second middleware service.

Figure 5:
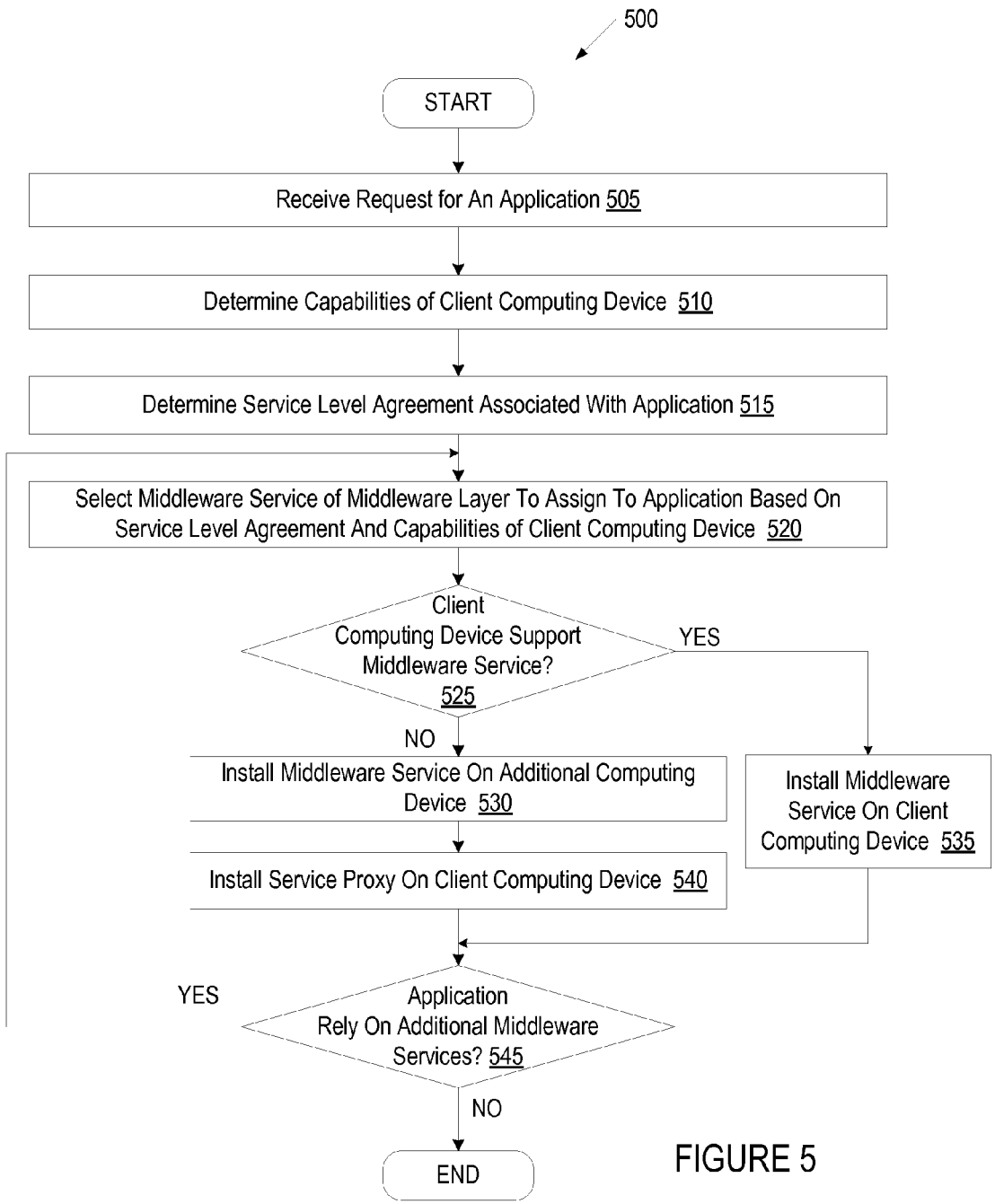
FIG. 5 illustrates a flow diagram of another embodiment for a method of deploying a middleware layer.

FIG. 5 illustrates a flow diagram of another embodiment for a method 500 of deploying a middleware layer. At block 505 of method 500, processing logic receives a request for an application (e.g., to execute an application). At block 510, processing logic determines capabilities of a client machine on which processing logic executes.

At block 515, processing logic identifies an SLA associated with the application. At block 520, processing logic selects a service of a middleware layer to assign to the application based on the SLA and capabilities of the client machine. For example, processing logic may identify each QoS obligation included in the SLA. Processing logic may then determine what performance characteristics may satisfy the QoS obligations, and may determine whether the client machine has hardware and/or software components that meet those performance characteristics. Processing logic may additionally, or alternatively, determine whether there is a middleware service that is installable on a remote machine, and whether there are any remote machines to install that middleware service on (e.g., a remote machine that has less than a specified amount of lag from the client machine and that has available resources sufficient to satisfy the SLA).

At block 525, processing logic determines whether the client machine supports the selected service. For example, processing logic may determine whether the client machine has performance characteristics that will satisfy service obligations and/or QoS guarantees included in the SLA. If the client machine supports the selected service, the method continues to block 535, and processing logic installs the selected service on the client machine. If the client machine does not support the selected service, the method proceeds to block 530.

At block 530, processing logic installs the selected service on an additional (remote) machine. The additional machine may be another client machine, or may be a server machine. The additional machine may be connected to the client machine directly (e.g., via a crossover cable, firewire, universal serial bus (USB), etc.) or via a network (e.g., via a LAN, WAN, the Internet, etc.). At block 540, processing logic installs a service proxy on the client machine. The service proxy may communicate with both the application and the middleware service. The service proxy may appear to the application to be the actual middleware service.

At block 545, processing determines whether the application relies on any additional middleware services (or whether the installed middleware service depends on any additional services). If so, the method returns to block 520, and blocks 520-540 are performed for an additional middleware service. Otherwise, the method ends.

Figure 6:
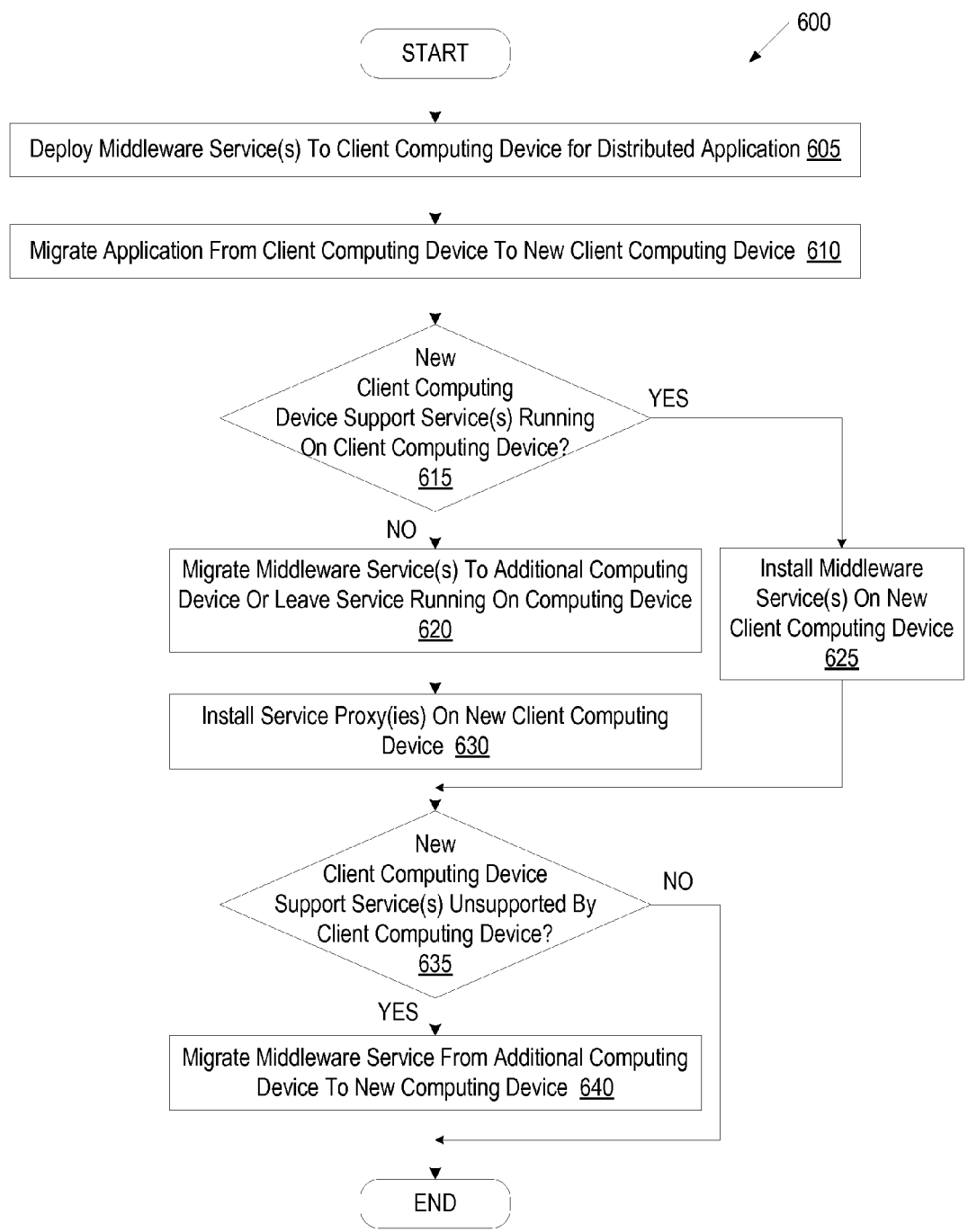
FIG. 6 illustrates a flow diagram of one embodiment for a method of updating a deployment of a middleware layer.

FIG. 6 illustrates a flow diagram of one embodiment for a method 600 of updating a deployment of a middleware layer. At block 605 of method 600, processing logic deploys a middleware service (or services) to a client machine. The middleware service may be deployed, for example, to support an application. At block 610, processing logic migrates the application from the client machine to a new client machine (or to a server machine).

At block 615, processing logic determines whether the new client machine supports the middleware service (or services) running on the client machine. In one embodiment, processing logic determines hardware performance characteristics of the new client machine such as available processing power, available memory, network connectivity, available network bandwidth, and so forth. Processing logic may also determine software performance characteristics of the new client machine, such as support for hypertext markup language 5 (HTML5), operating system (OS), support for virtualization, and so on. Processing logic then compares these performance characteristics to an SLA associated with the application. The new client machine may support the service or services if the performance characteristics of the new client machine will satisfy the SLA. If the new client machine does not support a middleware service, then the method continues to block 620. Otherwise the method proceeds to block 625.

At block 625, processing logic migrates the middleware service (or services) to the new client machine. This may include installing the middleware service on the new client machine and removing the middleware service from the previous client machine.

At block 620, processing logic migrates the middleware service (or services) to an additional computing device that supports the service. Alternatively, the middleware service (or services) may remain running on the client computing device. At block 630, processing logic installs a service proxy (or multiple service proxies) on the new client machine.

At block 635, processing logic determines whether the new client machine supports services that were unsupported by the original client machine. For example, if the new client machine has a greater processing power, more memory, higher network bandwidth, etc., than the original client machine, then the new client machine may support services that were unsupported by the original client machine. If the new client machine does support services that were unsupported by the original client machine, the method continues to block 640. Otherwise, the method ends.

At block 640, processing logic migrates the service from an additional computing device (e.g., another client machine or a server machine) to the new client machine.

Note that rather than migrating an installed middleware service, processing logic may also select a new middleware service that performs the same functionality as the installed middleware service. Processing logic may then install that new middleware service on the new client machine. Alternatively, processing logic may install the new middleware service on the additional machine, and may install a service proxy for that new middleware service on the client machine.

Figure 7:
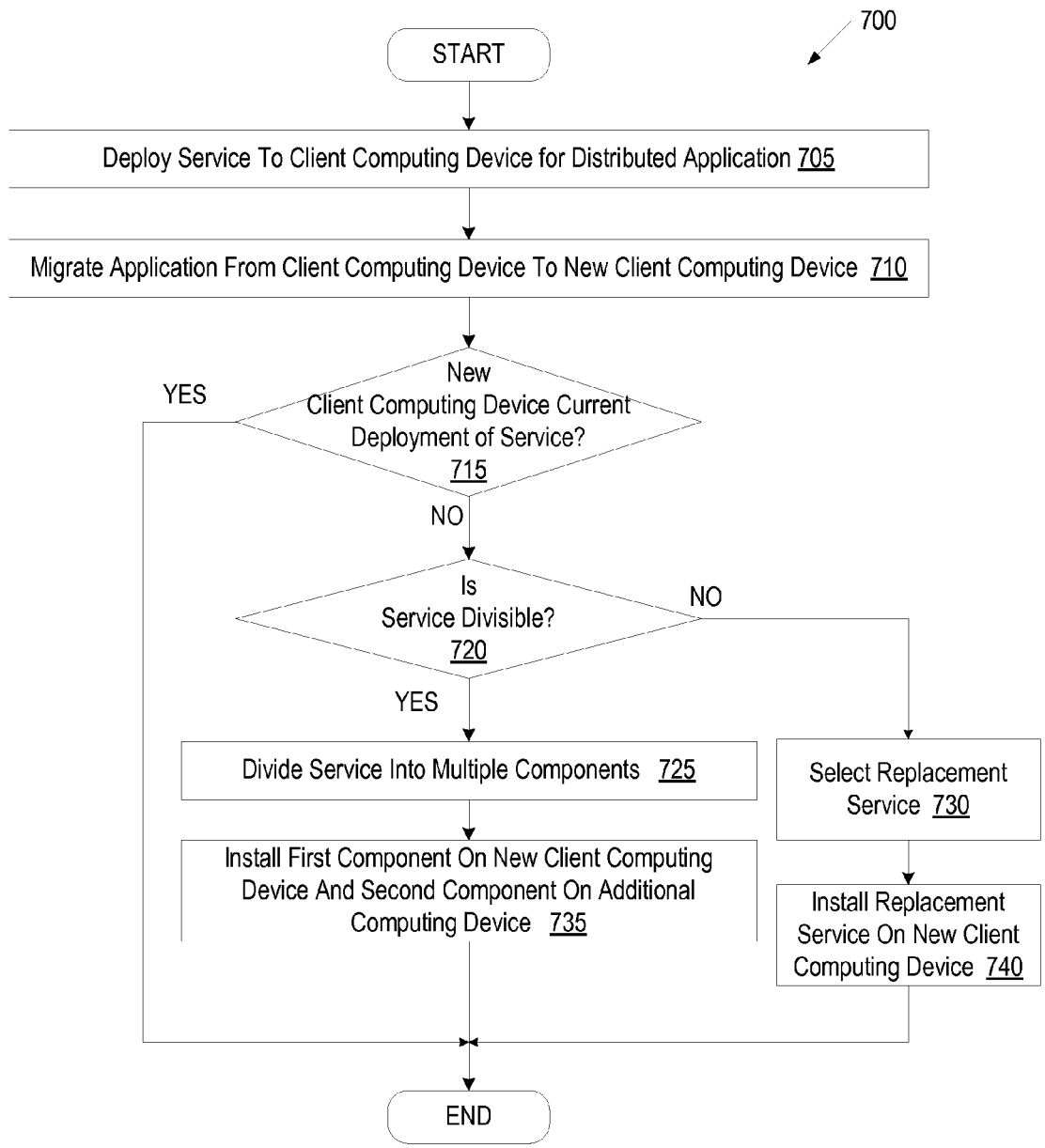
FIG. 7 illustrates a flow diagram of another embodiment for a method of updating a deployment of a middleware layer.

FIG. 7 illustrates a flow diagram of another embodiment for a method 700 of updating a deployment of a middleware layer. At block 705 of method 700, processing logic deploys a middleware service to a client machine to support an application. At block 710, processing logic migrates the application from the original client machine to a new client machine. The new client machine may have greater resources or fewer resources than the original client machine.

At block 715, processing logic determines whether the new client machine supports the middleware service. If so, then the method ends. Otherwise, the method continues to block 720.

At block 720, processing logic determines whether the middleware service is divisible. If the service is divisible, the method continues to block 725. If the middleware service is not divisible, the method proceeds to block 730.

At block 725, processing logic divides the middleware service into multiple components. For example, a reliable message service may be divided into a message queue module and a communication module. At block 735, processing logic then installs a first service component on the new client machine and installs a second service component on the original client machine or on an additional machine.

At block 730, processing logic selects a replacement middleware service. The replacement middleware service may perform the same or similar functionality as the original service, but may use fewer resources. At block 740, processing logic installs the replacement middleware service on the new client machine. The method then ends.

Figure 8:
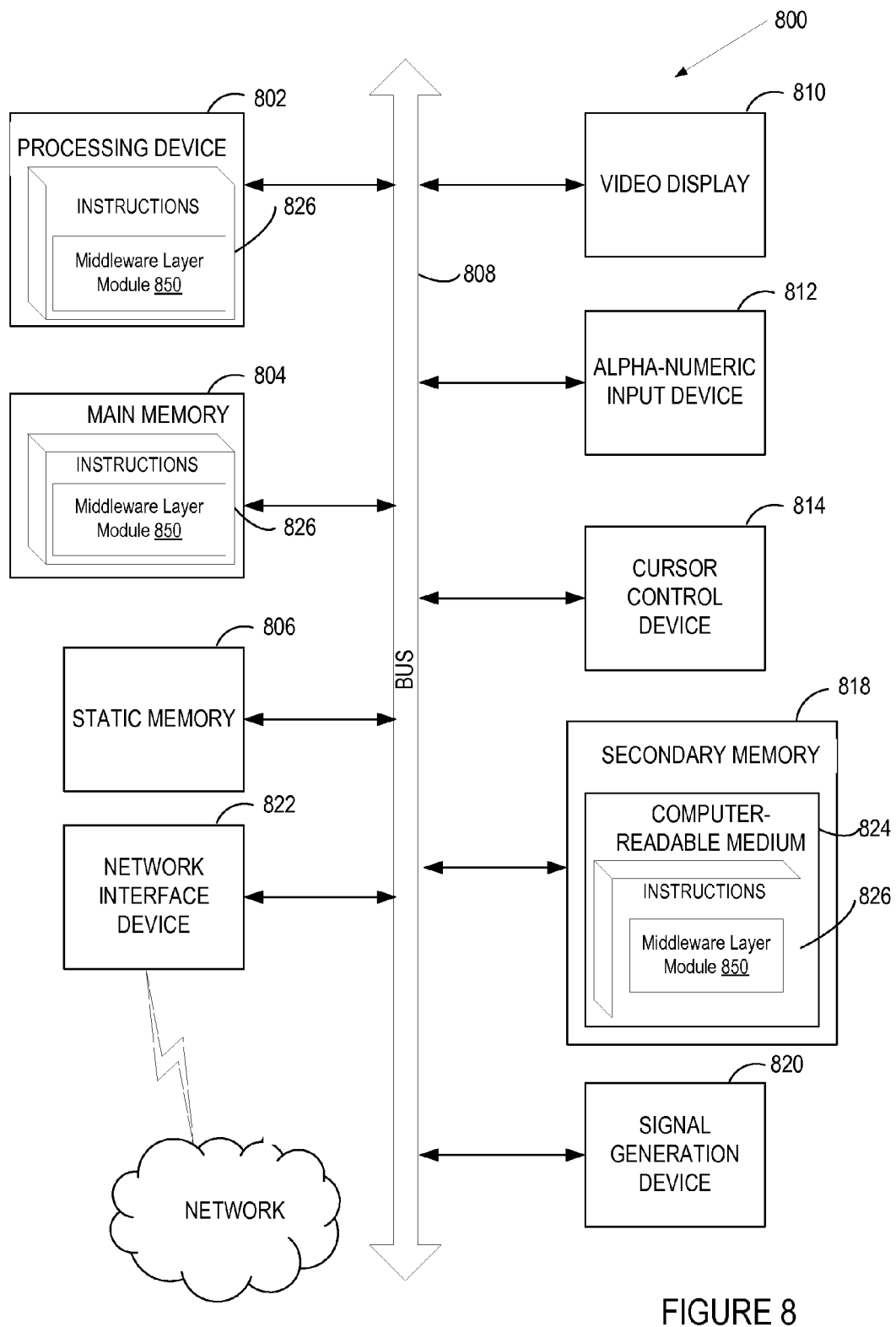
FIG. 8 illustrates a block diagram of an exemplary computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute processing logic (e.g., instructions 826) for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The secondary memory 818 may include a machine-readable storage medium (or more specifically a computer-readable storage medium) 824 on which is stored one or more sets of instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

The computer-readable storage medium 824 may also be used to store a middleware layer module 850 (which may correspond to middleware layer module 205 of FIG. 2), and/or a software library containing methods that call a middleware layer module 850. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   determining, by a processing device executing a middleware layer, capabilities of a computing device in response to receiving a request for an application;
   determining, by the middleware layer, a service level agreement of an application level service used by the application;
   selecting one or more services of the middleware layer to assign to the application in view of the service level agreement of the application level service used by the application, a service level agreement that specifies an obligation of the one or more services of the middleware layer with respect to the application, and whether a remote computing device has available resources to satisfy the service level agreement that specifies the obligation of the one or more services of the middleware layer with respect to the application;
   determining whether to install the one or more services on at least one of the computing device or on the remote computing device in view of the service level agreement of the application level service used by the application, the capabilities of the computing device and a resource specification of the one or more services;
   in response to a determination that the capabilities of the computing device are insufficient to satisfy a requirement of a first service of the one or more services,
      installing a proxy for the first service on the computing device; and
      installing the first service on the remote computing device, wherein the application interfaces with the proxy;
   determining that the first service invokes a second service on the remote computing device;
   migrating the first service and the second service from the remote computing device to an additional computing device;
   determining that the first service is divisible; and
   in response to a determination that the first service is divisible,
      dividing the first service into a plurality of components,
      causing an installation of a first component of the plurality of components on the computing device, and
      causing an installation of a second component of the plurality of components on an additional computing device.

2. The method of claim 1, further comprising:
   migrating the application to the additional computing device;
   determining additional capabilities of the additional computing device; and
   determining whether to migrate the one or more services from at least one of the computing device or the remote computing device to the additional computing device in view of the service level agreement of the application level service used by the application, the additional capabilities of the additional computing device and the resource specification of the one or more services.

3. The method of claim 2, further comprising:
   determining that the additional capabilities of the additional computing device are insufficient to support the first service;
   identifying a service that performs a functionality performed by the first service; and
   installing the service that performs the functionality performed by the first service on the additional computing device.

4. The method of claim 2, further comprising:
   determining that the additional capabilities of the additional computing device exceed the capabilities of the computing device.

5. The method of claim 1, wherein the computing device is one of a mobile phone, a tablet computer, a notebook computer, a desktop computer, or an embedded system.

6. The method of claim 1, wherein the first service is a reliable messaging service, and wherein the proxy comprises a message queue.

7. The method of claim 1, wherein the resource specification of the one or more services comprises additional service level agreements of the one or more services.

8. A non-transitory computer readable storage medium having instructions that, when executed by a processing device, cause the processing device to:
   determine capabilities of a computing device in response to receiving a request for an application;

determine, by a middleware layer, a service level agreement of an application level service used by the application;

select one or more services of the middleware layer to assign to the application in view of the service level agreement of the application level service used by the application, a service level agreement that specifies an obligation of the one or more services of the middleware layer with respect to the application, and whether a remote computing device has available resources to satisfy the service level agreement that specifies the obligation of the one or more services of the middleware layer with respect to the application;

determine whether to install the one or more services on at least one of the computing device or on the remote computing device in view of the service level agreement of the application level service used by the application, the capabilities of the computing device and a resource specification of the one or more services;

in response to a determination that the capabilities of the computing device are insufficient to satisfy a requirement of a first service of the one or more services,
install a proxy for the first service on the computing device; and
install the first service on the remote computing device, wherein the application interfaces with the proxy;

determine, by the processing device, that the first service invokes a second service on the remote computing device;

migrate the first service and the second service from the remote computing device to an additional computing device determine that the first service is divisible; and
in response to a determination that the first service is divisible,
divide the first service into a plurality of components,
cause an installation of a first component of the plurality of components on the computing device, and
cause an installation of a second component of the plurality of components on an additional computing device.

9. The non-transitory computer readable storage medium of claim 8, the processing device further to:
migrate the application to the additional computing device;
determine additional capabilities of the additional computing device; and
determine whether to migrate the one or more services from at least one of the computing device or the remote computing device to the additional computing device in view of the service level agreement of the application level service used by the application, the additional capabilities of the additional computing device and the resource specification of the one or more services.

10. The non-transitory computer readable storage medium of claim 9, the processing device further to:
determine that the additional capabilities of the additional computing device are insufficient to support the first service;
identify a service that performs a functionality performed by the first service; and
install the service that performs the functionality performed by the first service on the additional computing device.

11. The non-transitory computer readable storage medium of claim 9, the processing device further to:
determine that the additional capabilities of the additional computing device exceed the capabilities of the computing device.

12. The non-transitory computer readable storage medium of claim 8, wherein the computing device is one of a mobile phone, a tablet computer, a notebook computer, a desktop computer, or an embedded system.

13. The non-transitory computer readable storage medium of claim 8, wherein the first service is a reliable messaging service, and wherein the proxy comprises a message queue.

14. The non-transitory computer readable storage medium of claim 8, wherein the resource specification of the one or more services comprises additional service level agreements of the one or more services.

15. A device, comprising:
a memory to store instructions for a middleware layer module;
a network interface to communicate with a remote computing device; and
a processing device, operatively coupled to the memory and to the network interface, to execute the instructions, wherein the processing device is to:
determine capabilities of a computing device in response to receiving a request for an application;
determine a service level agreement of an application level service used by the application;
select one or more services of the middleware layer to assign to the application in view of the service level agreement of the application level service used by the application, a service level agreement that specifies an obligation of the one or more services of the middleware layer with respect to the application, and whether the remote computing device has available resources to satisfy the service level agreement that specifies the obligation of the one or more services of the middleware layer with respect to the application;
determine whether to install the one or more services on at least one of the computing device or on the remote computing device in view of the service level agreement of the application level service used by the application, the capabilities of the computing device and a resource specification of the one or more services;
in response to a determination that the capabilities of the computing device are insufficient to satisfy a requirement of a first service of the one or more services,
install a proxy for the first service on the computing device;
install the first service on the remote computing device; and
interface the application with the proxy;
determine that the first service invokes a second service on the remote computing device;
migrate the first service and the second service from the remote computing device to an additional computing device;
determine that the first service is divisible; and
in response to a determination that the first service is divisible,
divide the first service into a plurality of components,
cause an installation of a first component of the plurality of components on the computing device, and
cause an installation of a second component of the plurality of components on an additional computing device.

16. The device of claim 15, wherein the processing device is further to:

migrate, via the network interface, the application to the additional computing device;
determine additional capabilities of the additional computing device; and
determine whether to migrate the one or more services from at least one of the computing device or the remote computing device to the additional computing device in view of the service level agreement of the application level service used by the application, the additional capabilities of the additional computing device and the resource specification of the one or more services.

* * * * *